United States Patent [19]
Byerley

[11] Patent Number: 5,709,768
[45] Date of Patent: Jan. 20, 1998

[54] APPARATUS WITH ADJUSTABLE CIRCUMFERENCE MADE UP OF A PLURALITY OF INTERCONNECTED SHOES

[75] Inventor: Mark S. Byerley, Greenback, Tenn.

[73] Assignee: WYKO, Inc., Greenback, Tenn.

[21] Appl. No.: 739,676

[22] Filed: Oct. 29, 1996

Related U.S. Application Data

[63] Continuation-in-part of Ser. No. 547,381, Oct. 24, 1995, Pat. No. 5,635,016.

[51] Int. Cl.$^6$ .......................................... B29D 30/26
[52] U.S. Cl. ..................... 156/406.2; 156/417; 156/420; 249/181
[58] Field of Search ........................... 156/406.2, 417, 156/418, 419, 420, 414; 249/180, 181, 184, 185, 152, 170

[56] References Cited

U.S. PATENT DOCUMENTS

| | | | |
|---|---|---|---|
| 3,279,739 | 10/1966 | Long | 249/181 |
| 3,607,558 | 9/1971 | Nebout | 156/415 |
| 3,833,444 | 9/1974 | Mallory | 156/400 |
| 4,437,920 | 3/1984 | Kubo | 156/420 |
| 4,547,251 | 10/1985 | Landsness | 156/415 |
| 4,923,554 | 5/1990 | Ozawa | 156/417 |
| 5,203,947 | 4/1993 | Boeker | 156/417 |
| 5,441,587 | 8/1995 | Byerley | 156/406.2 |

FOREIGN PATENT DOCUMENTS

| | | | |
|---|---|---|---|
| 852632 | 8/1981 | U.S.S.R. | 156/406.2 |
| 1696315 | 12/1991 | U.S.S.R. | 156/414 |

*Primary Examiner*—Geoffrey L. Knable
*Attorney, Agent, or Firm*—Paul E. Hodges, P.C.

[57] ABSTRACT

Apparatus including a frame, preferably circular in geometry and having a cental axis. At spaced apart locations about the circumference of the frame there are provided a plurality of links, each of which is pivotally mounted on a the frame and each of which carries a shoe having an arcuate surface. Each link includes at least one leg portion having an outboard end. The outboard ends of the leg portions of the plurality of links are interconnected with one another and with a drive mechansim whose operation serves to rotate the interconnected links in unison about their respective rotational mountings to the frame. As the links are rotated, their respective shoes are caused to move along an arcuate path which repositions the shoes generally radially inwardly or outwardly with respect to the central axis of the apparatus. To retain the circularity of the arcuate surfaces of the shoes as they are moved radially inwardly and outwardly, the shoes are interconnected by respective rigid rods. One end of each rod is fixedly anchored in a slot opening outwardly of one side margin of a first shoe and projects therefrom to have its opposite end slidably received in a second slot in a circumferentially adjacent shoe. The slots and rod share a common longitudinal axis, which axis is oriented normal to a radius of the frame.

5 Claims, 8 Drawing Sheets

APPARATUS WITH ADJUSTABLE CIRCUMFERENCE MADE UP OF A PLURALITY OF INTERCONNECTED SHOES

CROSS-REFERENCE TO RELATED APPLICATIONS

This application is a continuation in part of application Ser. No. 08/547,381, filed Oct. 24, 1995, now U.S. Pat. No. 5,635,016, entitled APPARATUS WITH ADJUSTABLE CIRCUMFERENCE, which application in its entirety is incorporated herein by reference.

BACKGROUND OF THE INVENTION

This invention relates to devices that are particularly useful in the making of vehicle tires and relates, more particularly, to apparatus defining an outer circumference suitable to serve as a forming surface or to grasp the inner circumference of a tubular or like object, or an as an inner circumference to serve to grasp the outer circumference of a circular, tubular or round object. More specifically, this invention relates to an improved belt and tread drum or an improved transfer ring, useful in the manufacture of vehicle tires.

The manufacture of a vehicle tire commonly includes the steps of forming a tire carcass, forming a belt and tread portion of the tire separately of the carcass, and thereafter marrying the belt and tread portion of the tire to the carcass to form a "green" tire. The green tire is thereafter treated to form the tread and various other features of the tire. Other supplementary steps, such as stitching, may be performed during the course of or following one or more of the aforementioned steps.

Formation of the belt and tread portion of the tire is accomplished on a belt and tread drum. Such a drum has an outer cylindrical surface, or circumference, about which one or more layers of tire belt material (comprising, for example, reinforcement cords embedded in a polymeric binder) are laid, and subsequent to the laying down of the tire belt material, the belt material is overlaid with one or more layers of strip tread material to comprise a "package".

The belt and tread drum is rotatably mounted about a central longitudinal axis, and the several layers that make up the belt and tread package are laid onto the drum as it is rotated. The circumference of such a drum is preferably capable of expanding and contracting to, for example, accommodate the removal of a completed package (which is essentially nonexpandable radially) from the drum circumference and to enable a single drum to be used to form belt and tread packages of alternative diameters. The circumference of such a drum can be collectively comprised of a plurality of rigid arcuate segments (i.e. shoes) wherein each segment provides an arc of the cylindrical surface and is mounted for movement toward and away from the longitudinal axis of the drum to accommodate the adjustment in drum circumference. Furthermore, each segment may be provided with a plurality of fingers which cooperate, or mate with, the fingers provided in an adjacent segment so that as the circumference of the drum is expanded and contracted, the cooperating fingers render the perimeter of the cylindrical surface usefully continuous.

In the manufacture of vehicle tire, a carcass is formed on a drum in a manner somewhat similar to the forming of a belt and tread package so that the drum used in forming a tire carcass may employ the concepts of the present invention. Further, after the carcass has been formed, it is transferred to a second stage drum and held thereon while a belt and tread package is transferred from the belt and tread drum onto the outer circumference of the carcass employing a transfer ring. Thereafter the belt and tread package is married to the carcass. The transfer ring commonly employed comprises basically an inverted belt and tread drum. That is, whereas the outer circumference of the belt and tread drum is adjustable to accommodate the formation of the belt and tread package thereon and to permit the removal therefrom of a completed belt and tread package, the inner circumference of the transfer ring is adjustable to permit the ring to encompass the outer circumference of the belt and tread package and contract in diameter to cause the shoes of the transfer ring to engage and grasp the belt and tread package for transferring of the package to the carcass of the tire.

Desirably a transfer ring or belt and tread drum as employed in the vehicle tire manufacturing industry, incorporates a maximum range of adjustability of diameter of the transfer ring or drum such that the transfer ring can be used in the manufacture of a relatively large range of vehicle tire sizes (diameters). In order for the individual shoes of a transfer ring to the move radially outward, the mechanism for mounting each of the shoes includes a hinge connection of the shoe to the mechanism which moves the shoe generally radially, inwardly and outwardly. This hinged connection permits the shoe to rotate freely about the hinge connection. In applicant's copending applications, Ser. No. 08/547,381, rotation of the sections of a multisectional arcuate segment (i.e. shoe) is controlled by guide plates attached to the sections of adjacent shoes and which interact with pin means on the sections of adjacent shoes to aid in maintaining the circular attitude of the sections of the several shoes. The fabrication, installation and maintenance of this type of interconnection of the adjacent shoes of the transfer ring or drum, however, are time consuming and expensive.

It is therefore an object of the present invention to provide an improved method and apparatus for stabilizing the concentric alignment of the plurality of shoes of an apparatus having an adjustable circumference made up of a plurality of shoes.

It is another object of the present invention to provide a new and improved belt and tread drum or transfer ring of the aforedescribed class wherein rotational movement of the shoes about their respective hinge axes is restrained.

Another object of the present invention is to provide such a belt and tread drum or transfer ring having circumference providing shoes which are uncomplicated in construction and effective in operation.

It is another object to provide a multi-shoe expandable/collapsible apparatus for grasping the inner diameter or the outer diameter of circular or ring-type objects and wherein the rotational movement of the shoes about their respective hinge axes is restrained.

SUMMARY OF THE INVENTION

In its broader aspects, the present invention provides a frame which serves to mount a plurality of shoes having respective arcuate surfaces that collectively define the circumference of an apparatus having a central axis and for use as a forming surface (as in the build up of a belt and tread package for a vehicle tire), or for use, in grasping the inner circumference or the outer circumference of a circular, tubular or round object (as in a transfer ring). Each shoe is mounted on the frame for generally radial movement inwardly and outwardly, relative to the central axis of the apparatus.

In accordance with one aspect of the present invention, there is provided an apparatus including a frame, preferably circular in geometry and having a central axis. At spaced apart locations about the circumference of the frame there are provided a plurality of links, each of which is pivotally mounted on the frame. Each link includes at least one leg portion having an outboard end. The outboard ends of the leg portions of the plurality of links are interconnected with one another and with a drive mechanism whose operation serves to rotate the interconnected links in unison about their respective rotational mountings to the frame. As the links are rotated, their respective shoes are caused to move along an arcuate path which repositions the shoes generally radially inwardly or outwardly with respect to the central axis of the apparatus. Through choice of the angularity between the first and second leg portions of each link, the location of the rotational mounting of the link to the frame, and the degree of rotation of the link, the extent of radial displacement of the shoes per unit of movement of the drive mechanism is selectable.

To each link there is hingedly mounted a shoe. Because each shoe is hinged to its respective link, and because it is desired that the moving shoes retain their circular attitude as they are displaced generally radially inwardly or outwardly of the frame, the present invention provides for retention of this desired circularity of attitude of the shoes. This feature is accomplished in the present invention by a rigid rod that has one of its ends fixedly anchored in a slot opening outwardly of one side margin of a first shoe. This rod projects from its mounting slot and away from the first shoe toward a second and circumferentially adjacent shoe where the outboard end of the rod is slidably received in a further slot provided in, and opening outwardly of, that side margin of the second shoe that faces the side margin of the first shoe. The slots, and the rod disposed therein, share a common longitudinal axis so that as the shoes are displaced radially inwardly or outwardly, they are restrained to identical degrees of rotation about their respective hinge axes. As the shoes are displaced radially outwardly along their respective arcuate path, the distance between adjacent shoes increases. To accommodate this separation distance change, the outboard end of the rigid rod slides within its slot in the second shoe. The length of the rigid rod, therefore, is chosen to ensure that a material portion of the rod remains within the slot in the second shoe at all radial positions of the shoe.

All of the shoes of the apparatus are interconnected by respective rigid rods that extend between the facing side margins of circumferentially adjacent shoes so that all the shoes are restrained to identical degrees of rotation about their respective hinge axes. This is in part accomplished by orienting the slots in the several shoes at the same angle relative to a radius of the circular frame.

In order to maintain the circularity of the arcuate surfaces of the plurality of shoes during their radial inward and outward displacement, the present invention has found that the common longitudinal axis which is shared by the slots in the facing side margins of circumferentially adjacent ones of the shoes, be properly angularly aligned with a radian originating at the central axis of the frame. In accordance with one aspect of the present invention, this angular alignment is established such that the common axis of the slots in the facing side margins of circumferentially adjacent shoes (hence the longitudinal axis of the rigid rod that occupies these slots) is oriented perpendicular to a radian emanating from the central axis of the frame and passing equidistantly between the hinge axes of two circumferentially adjacent shoes.

Importantly, the construction of the present shoe alignment restraint arrangement provides for efficient and relatively inexpensive fabrication of the shoes. In accordance with this aspect of the present invention the shoes which define the circumference of the transfer ring or drum, the mounting bores for the hinge mounting of the shoes, the slots in the facing side margins of circumferentially adjacent shoes, and access openings for receiving removable securements for releasably anchoring an end of a rod in a respective shoe are initially formed as a continuous ring in a single manufacturing setup. Thereafter, this ring is cut into individual identical arcuate shoes. By this means, there is assured accuracy of positioning of the slots, angularity of the axis of each slot relative to a radian of the apparatus, and access openings for insertion of removable securements for releasably anchoring one end of the rod in a respective slot. Further, the ability to perform the multiple fabrication operation in a single setup minimizes this fabrication cost of the apparatus.

In accordance with one feature of the present invention, the rigid arms which interconnect the first outboard ends of circumferentially adjacent ones of the links in the drive train for the apparatus are made adjustable in length to provide for adjustment of the spacing between adjacent ones of the shoes that are associated with the adjacent links.

BRIEF DESCRIPTION OF THE DRAWINGS

The above and further features of a preferred embodiment of the present invention may be best understood with reference to the following detailed description of a preferred embodiment and the drawings in which.

DETAILED DESCRIPTION OF INVENTION

Figure 1:
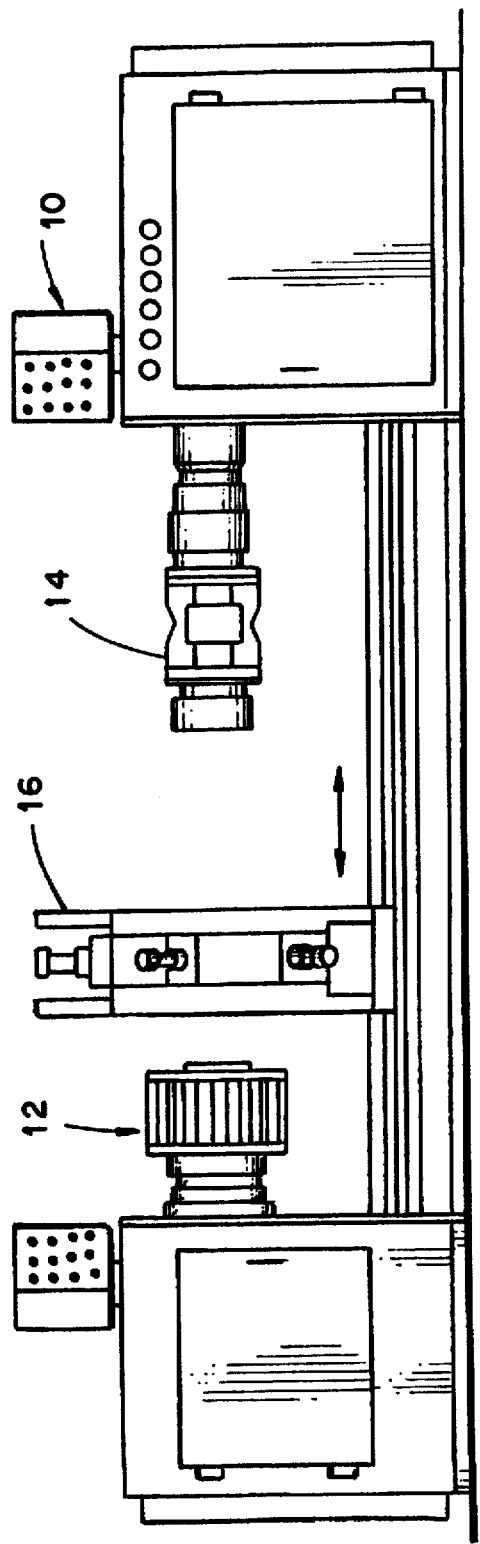
FIG. 1 is a side view of a tire making machine depicting, among other things, a belt and tread drum and a transfer ring.

Referring now to the Figures in which like reference numerals indicate like or corresponding features, there is shown in FIG. 1 a tire building machine 10 within which features of the present invention are embodied, including a belt and tread drum 12, an expander drum 14, and a transfer ring 16. As noted herein above, the making of a vehicle tire is effected in multiple stages. In a first stage, the carcass of the tire is formed. This carcass comprises a sheet of polymeric material having embedded reinforcement cords and formed around two bead wires to form the flexible inner carcass of the tire. A second stage of the tire-building process involves the forming of a belt and tread package on the belt and tread drum 12.

The carcass formed in the first stage is transferred to an expander drum 14 which contacts the beads of the carcass to form an airtight seal and inflates the carcass so that the outer diameter thereof is slightly less than the inner diameter of the belt and tread package of the tire. Once the first stage carcass is placed upon the expander drum 14, a transfer ring 16 is placed around the belt and tread package, and the belt and tread drum is collapsed so that the package is supported by the transfer ring 16. The transfer ring 16 then transfers the belt and tread package to the expander drum 14 and positions the package around the outside of the partially inflated carcass which is already in position on the expander 14. The carcass is then further inflated to contact the inside of the belt and tread package, and the belt and tread package is subsequently married to the carcass.

As far as the construction of the belt and tread drum 12 is concerned, the circumference of the drum 12 is capable of expanding to various diameters to accommodate the build up of belt and tread packages for tires of different diameters. Therefore, when tires of various sizes need to be made on a given, or single, drum, the diameter of the circumference of the belt and tread drum must be adjusted accordingly. Additionally, the belt and tread drum must be able to be collapsed from an expanded condition to permit the belt and tread package to be removed for transfer to a subsequent stage of the tire making process.

Figure 2:
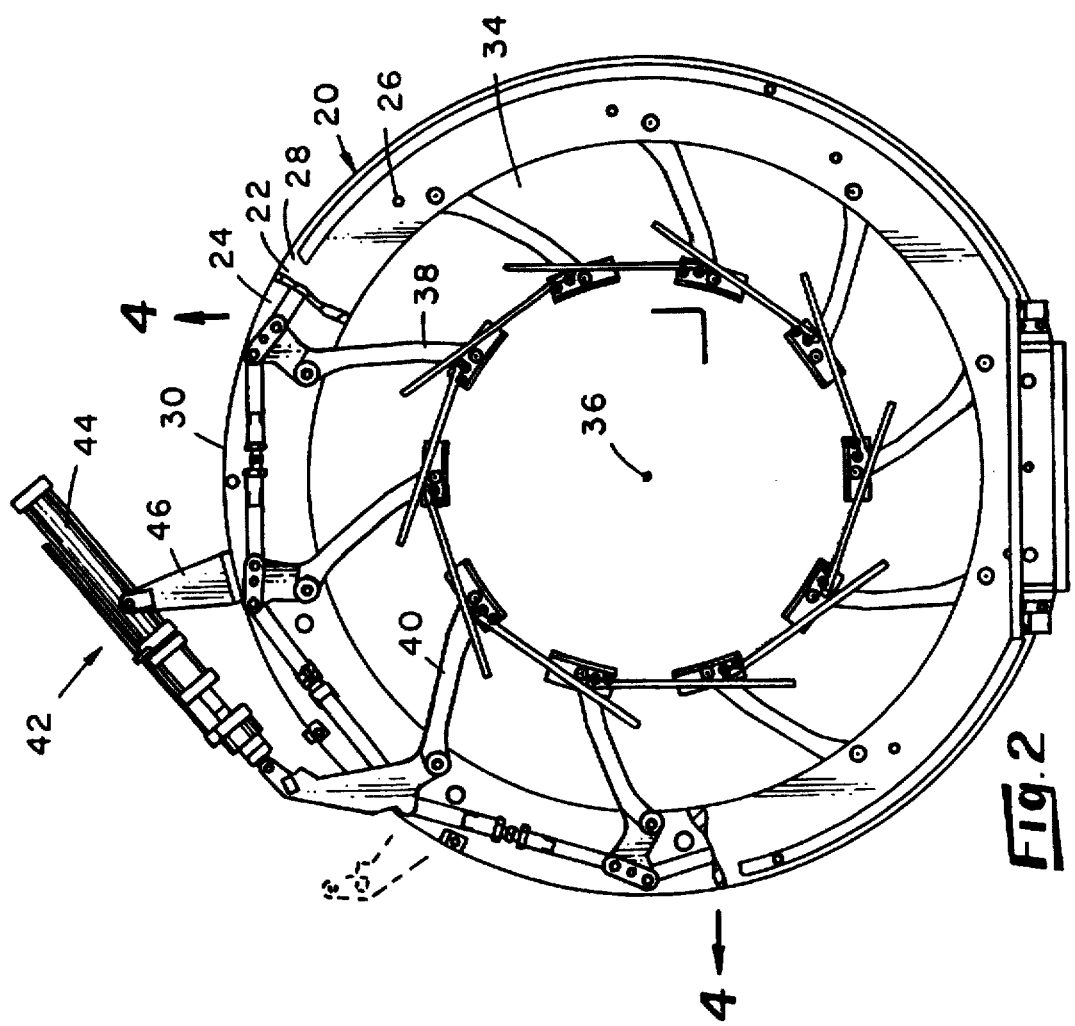
FIG. 2 is a plan elevation view of a transfer ring, partly sectioned, embodying various of the features of the present invention.

With initial reference to FIGS. 1 and 2, in accordance with one embodiment of the present invention, there is provided a circular frame 20 which in the depicted embodiment includes first and second side ring members 22 and 24. These ring members are disposed in opposing relationship to define opposite sides of the frame. The spaced apart relationship of the side rings is established and maintained by cross connecting rods 26 (typical) located at spaced apart locations about the circumference of the side rings. The outboard edges 28 and 30 of the side rings 22 and 24 are provided with circumferential respective grooves 31 and 33 (see FIG. 5) which opens inwardly of the spaced apart side rings. A circular substantially rigid cover 32 is fitted into these grooves and extends substantially around the circumference of the frame. In this manner, the side rings and the cover define an interior circular cavity 34 within the frame. This frame further includes a central axis of rotation 36.

Figure 3:
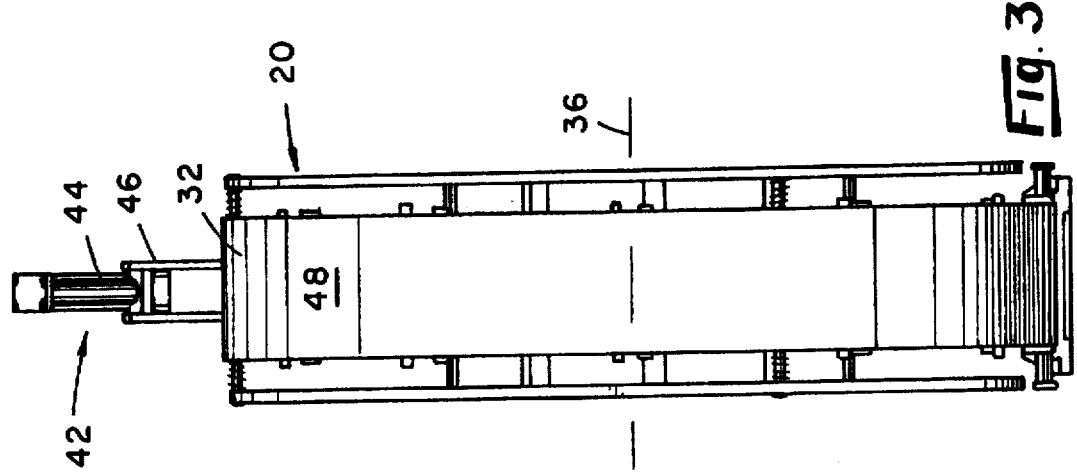
FIG. 3 is a side elevation view of the transfer ring of FIG. 2.

Within the interior cavity 34 of the frame 20 and at circumferentially spaced apart locations, there are rotationally mounted a plurality of links 38 (typical). In the depicted embodiment there are provided ten links, nine of which are substantially identical and the tenth one of which comprises a drive link 40. The several links 38 are interconnected with one another and with the drive link 40. The drive link is connected in driven relationship to a drive means 42 such as a piston-cylinder 44 so that the links and the drive means constitute a drive train for the simultaneous rotational movement of the links. The piston-cylinder preferably is pneumatically powered, but may be hydraulically powered, from a source of pressurized fluid (not shown) and employing a control mechanism such as that disclosed in copending application Ser. No. 08/547,381 or by a conventional control mechanism. As depicted in FIG. 3, the piston-cylinder drive means 42 is pivotally mounted as by a bracket 46 to the outer surface 48 of the cover member 32 of the frame 20.

Figure 5:
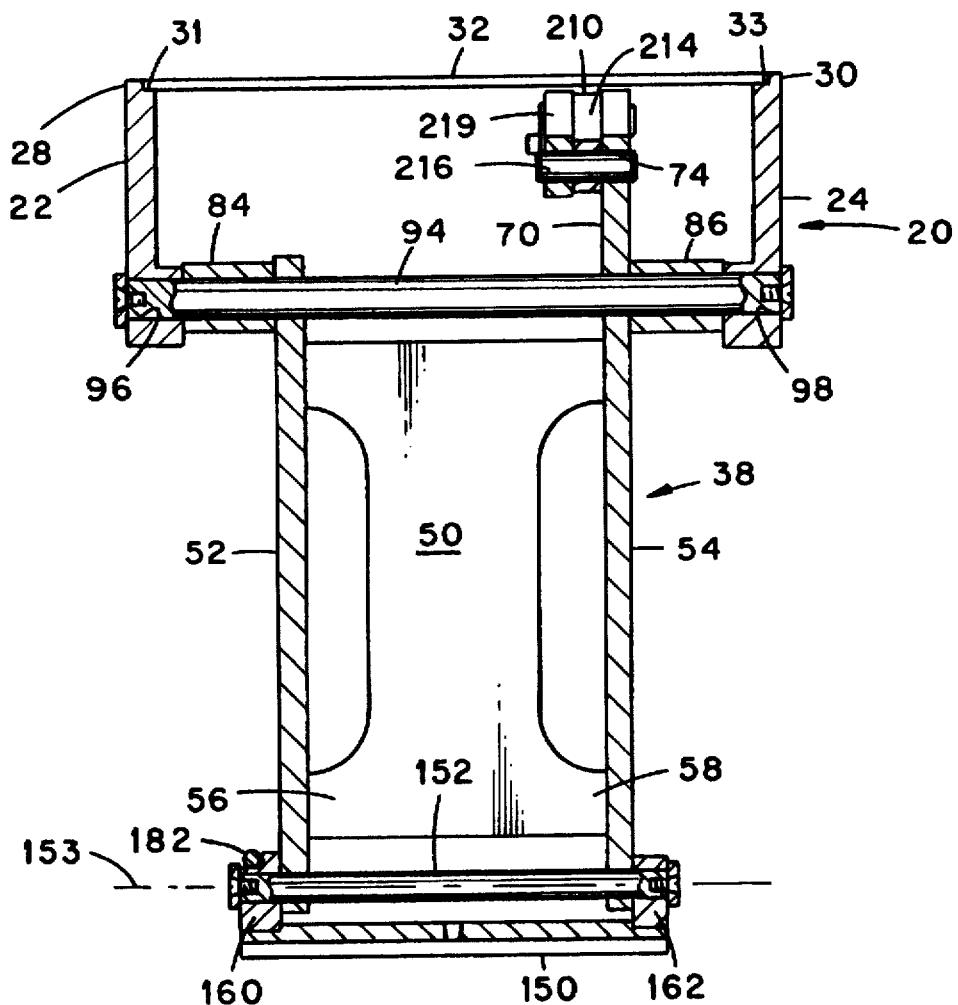
FIG. 5 is a sectional view of a non-drive link and included a shoe attached thereto as employed in one embodiment of the present invention.
Figure 6:
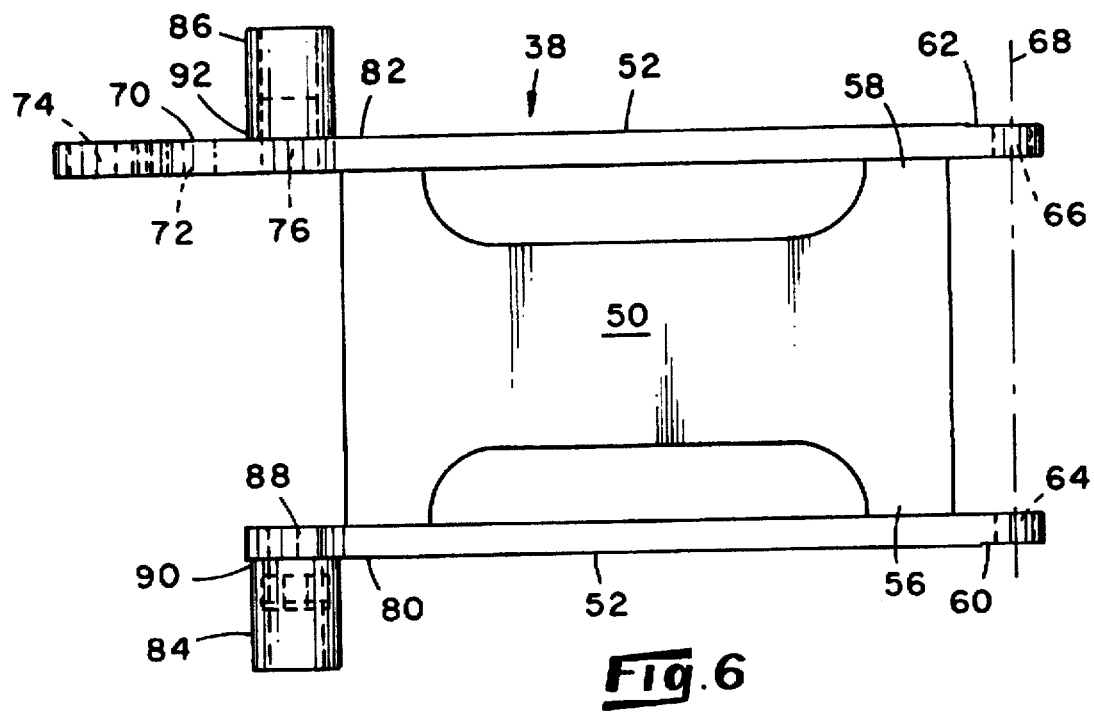
FIG. 6 is a plan view of a non-drive link as employed in the present invention.
Figure 7:
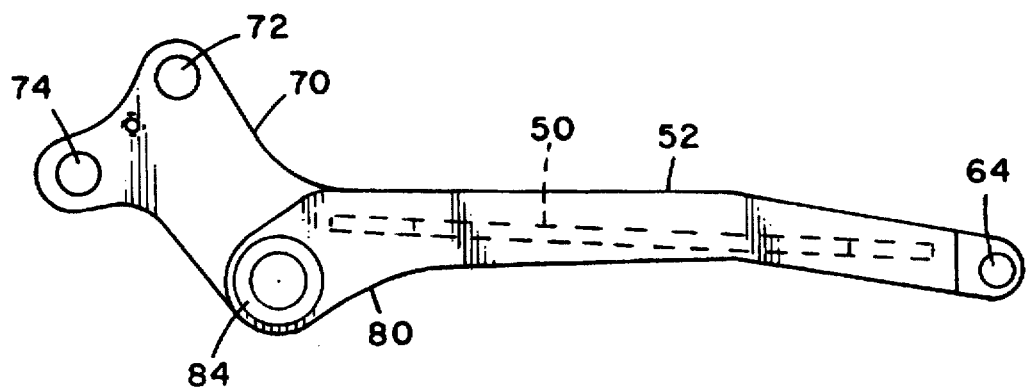
FIG. 7 is a side elevation view of the link depicted in FIG. 6.

As noted, in an apparatus of the present invention which employs ten shoes disposed circumferentially about the frame 20, nine of the shoes are identical and the tenth shoe is designed to be operatively connected to the drive 42. FIGS. 5, 6 and 7 depict one of the "nine" links 38 and FIGS. 8 and 9 depict a drive link 40.

As shown in FIGS. 5, 6 and 7, the link 38 comprises a generally flat planar central body portion 50. First and second, generally planar, side arms 52 and 54 are fixedly secured to the opposite side edges 56 and 58 of the body portion, as by welding. The first and second side arms 52 and 54 in this depicted embodiment include respective first ends 60 and 62, (inboard relative to the frame) each having a through bore 64 and 66, respectively, provided through its thickness adjacent its first end. These through bores share a common central axis 68 and therefore are in register.

The first and second side arms 52 and 54 are generally identical except the second side arm 54 includes a distal extension 70 whose function is to connect the link 38 in the drive train for simultaneous rotational movement of the several links. To this end, the distal extension 70 of the second side arm 54 includes two through bore 72 and 74 through the thickness thereof which serve as connection points in the drive train that provides for rotation of the links 38. Intermediate the first end 62 and the distal extension 70 of the second side arm 54, this second side arm is provided with a further through bore 76 through its thickness which is employed in pivotally mounting the link 38 to the frame 20. The end 60 of the first side arm 52 is likewise provided with a through bore 88 through the thickness thereof, this latter through bore being in register with the through bore 76 of the second side arm 54. Further, the outboard sides 80 and 82 of the side arms 52 and 54 are provided with stub tubular spacers 84 and 86 whose respective central cavities are coaxially aligned with their respective through bores 88 and 76. One of the ends 90 and 92, respectively, of each spacer is fixedly secured to its respective side arm as by welding. As best seen in FIG. 5, a pivot pin 94 is inserted in the through bores 88 and 76 and through the spacers 84 and 86, and through the through bores 96 and 98 in the frame to pivotally mount the link 38 to the frame, this pivot pin also serving to define a rotational axis 99 for the link 38. The distances from the through bores 60 and 62 of the first and second side arms 52 and 54 to their respective through bores 88 and 76 are equal to ensure that all of the respective arcuate surfaces of the hinged shoes are retained in true circumferential relationship to the central axis of the frame, i.e. no shoe is canted out of concentricity with the central axis of the frame.

Figure 8:
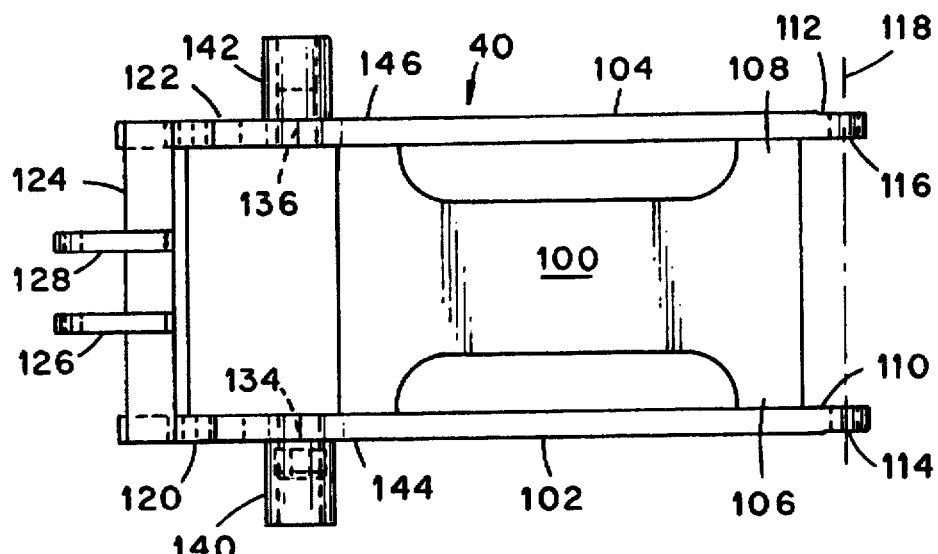
FIG. 8 is a plan view of a drive link as employed in the present invention.
Figure 9:
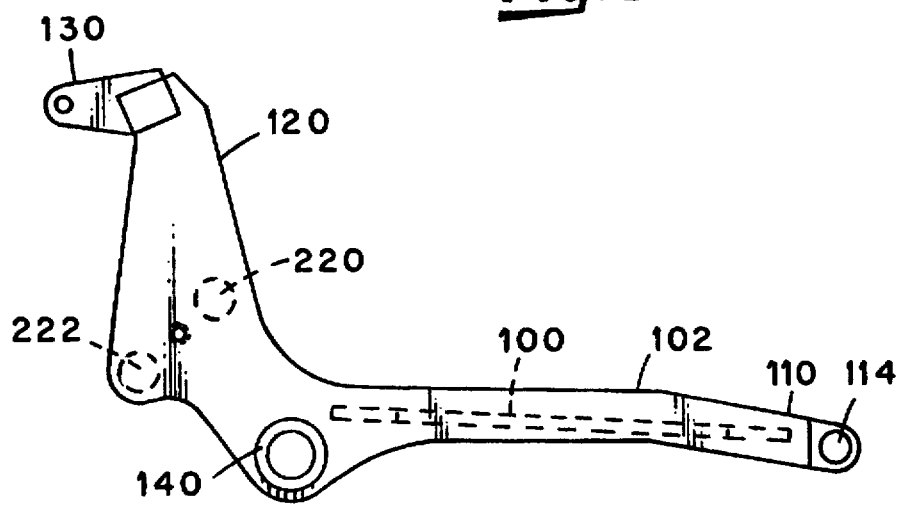
FIG. 9 is a side elevation view of the link depicted in FIG. 8.

With reference to FIGS. 8 and 9, the drive link 40 includes a generally flat planar central portion 100. Similarly to the link 38, first and second, generally planar, side arms 102 and 104 are fixedly secured to the opposite side edges 106 and 108 of the body portion of the drive link, as by welding. The first and second side arms 102 and 104 in this depicted embodiment are essentially mirror images of one another and include respective first ends 110 and 112, each having a through bore 114 and 116, respectively, provided through its thickness adjacent its respective distal end. These through bores share a common central axis 118 and therefore are in register. The first and second side arms 102 and 104 of the drive link further include respective ends 120 and 122 which project from the link generally radially outwardly of the frame. As best seen in FIG. 8, these outboard ends 120 and 122 of the drive link side edges 102 and 104 are connected together by a cross member 124 that extends therebetween. Centrally of the length of the cross member 124 there is provided a pair of upstanding posts 126 and 128 that are spaced apart from one another to receive therebetween a connector 130 (FIG. 4) which is secured on the outboard end of the piston rod 132 of the drive 42. Intermediate the opposite ends of the respective side arms 102 and 104, each side arm is provided with a through bore 134 and 136, respectively, through its thickness, these bores serving to receive therethrough a pivot pin 138 (FIG. 4) for pivotally mounting of the drive link 40 to the frame 20. As needed, cylindrical spacers 140 and 142 are secured to the outboard sides 144 and 146 of each of the side arms of the drive link 40.

Figure 4:
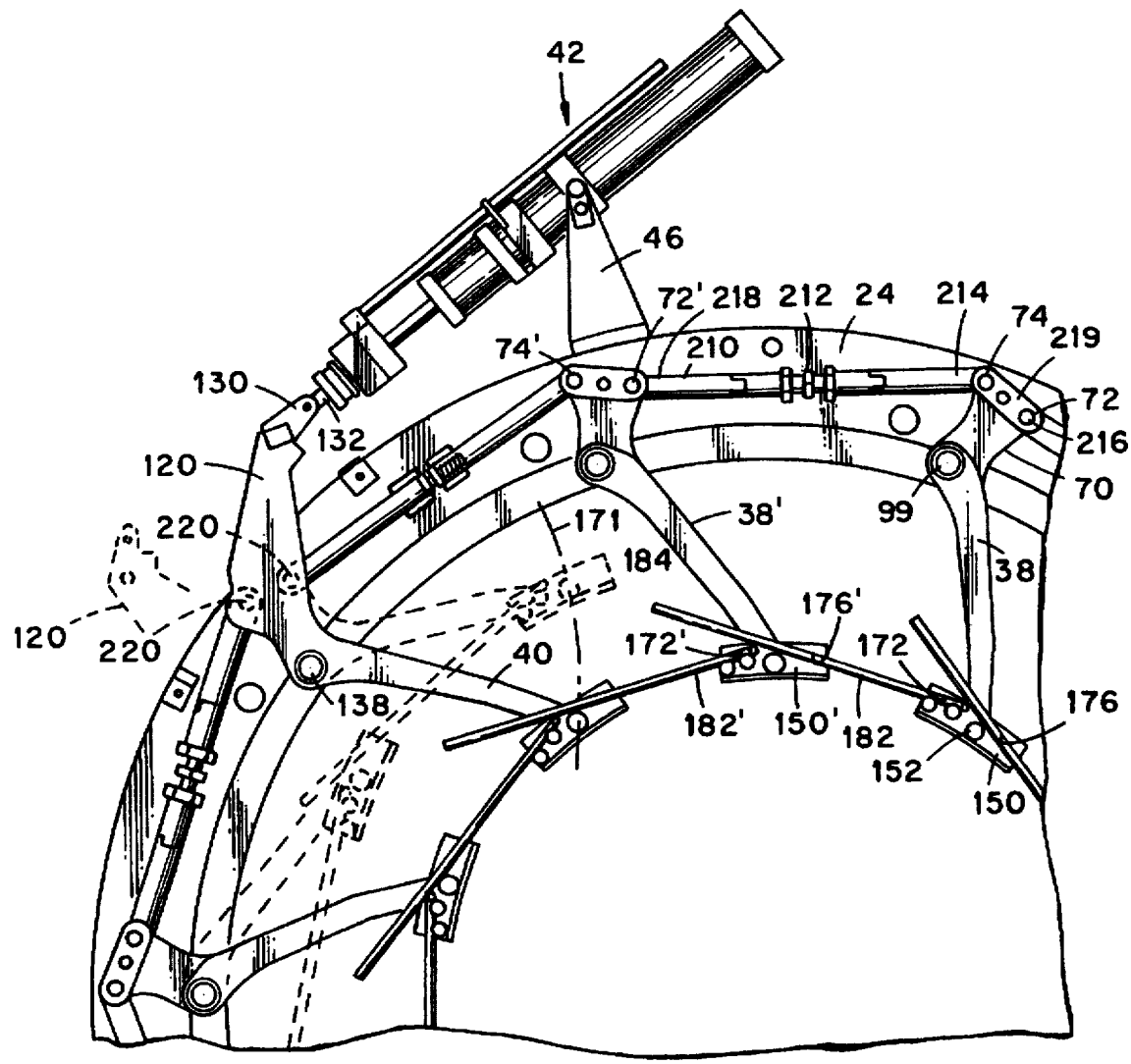
FIG. 4 is an enlarged view of approximately the upper left hand quadrant of the transfer ring depicted in FIG. 2.
Figure 10:
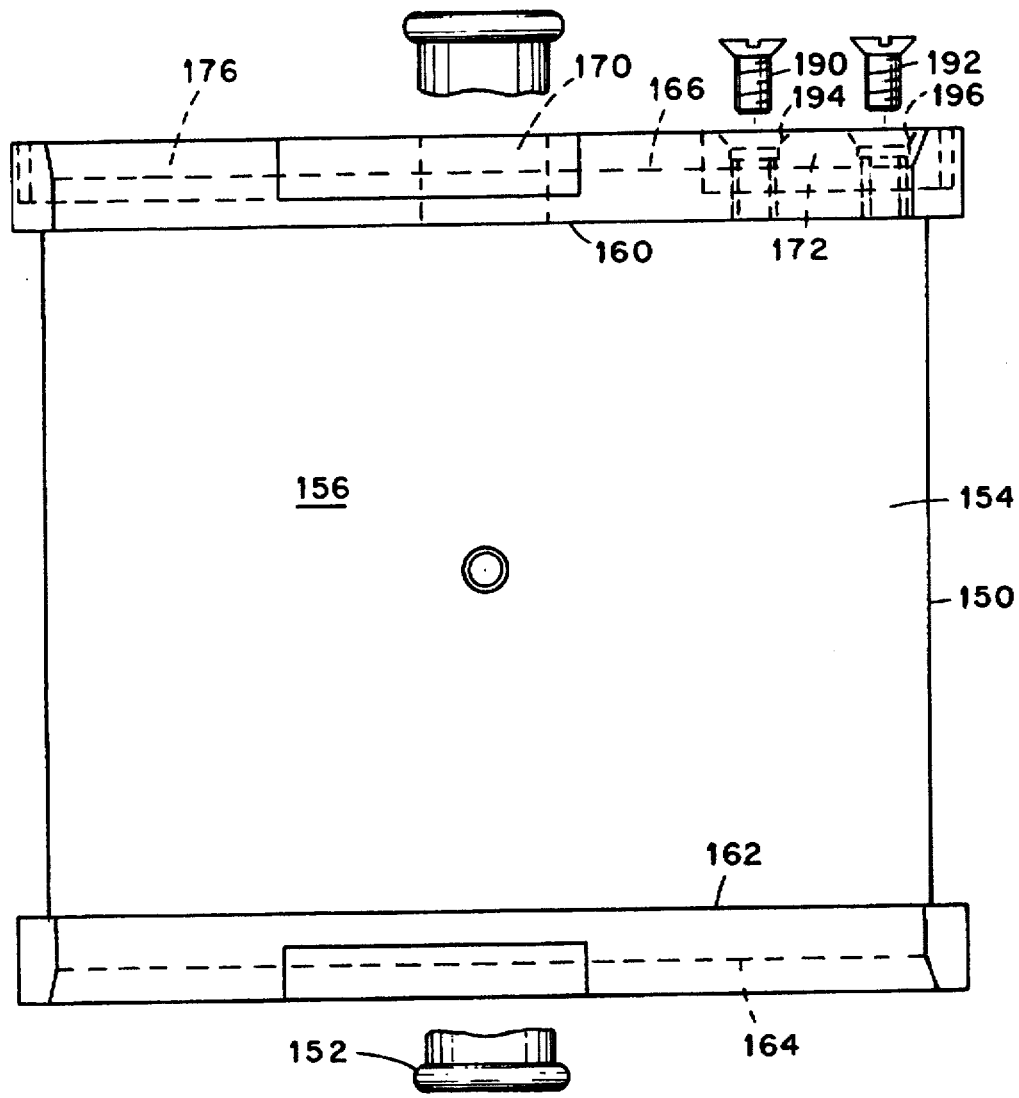
FIG. 10 is a plan view of a shoe as employed in the present invention.
Figure 11:
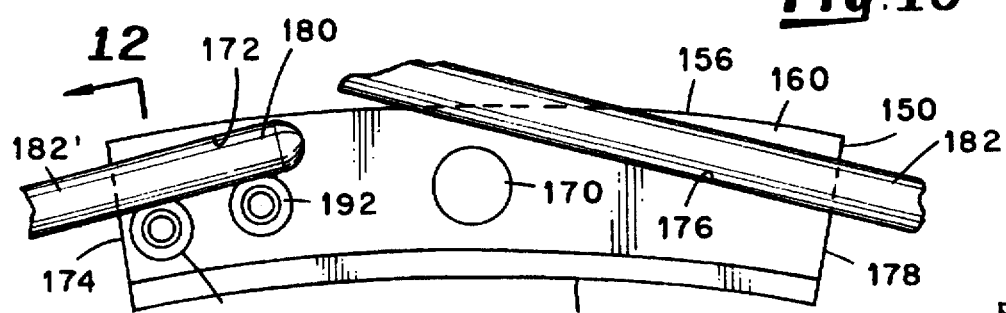
FIG. 11 is an end elevation view of the shoe depicted in FIG. 10.
Figure 12:
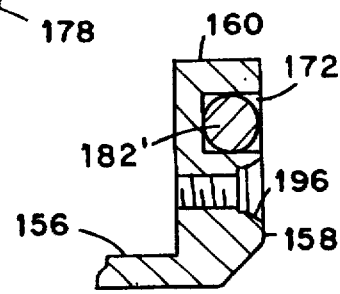
FIG. 12 is a sectional view taken generally along the line 12—12 of FIG. 11.

With specific reference to FIGS. 4 and 10, each link 38 and the drive link 40 includes a shoe 150 hingedly attached to, and between the opposite distal ends of, the side arms of each link as by a hinge pin 152 (typical) (see FIG. 5) which further serves to define a pivot axis 153 for the shoe 150. With reference to FIGS. 10 and 11, in one embodiment, each shoe 150 includes a body portion 154 having opposite surfaces 156 and 158. The shoe depicted in OFIGS. 10 and 11 further includes first and second elongated lugs 160 and 162 that are secured to the radially outermost surface 154 of the shoe adjacent opposite side edges 164 and 166, respectively, of the shoe. Each of these lugs is provided with a through bore 168 and 170 through the thickness thereof for receiving therein the pivot pin 152 employed to pivotally mount the shoe to the outboard ends of the side arms 52 and 54 of a link 38. In the depicted embodiment, the surface 158 of each shoe defines an arcuate surface that is oriented facing inwardly of the frame 20 such as would be employed in a transfer ring, for example. The collective arcuate surfaces of the shoes, in the depicted embodiment, define a circumferential surface for use in grasping the outer surface of an object having a cylindrical, tubular, round or like outer surface. In the manufacture of vehicle tires, the grasped object may be a belt and tread package. In an alternative embodiment, the shoes may be disposed about the outer circumference of the frame with their arcuate surfaces defining an outer circumferential surface which is suitable for grasping the inner circumference of a pipe, toroid, hollow cylinder, etc or serving as a drum in a vehicle tire manufacturing process.

By reason of the pivotal mounting of the links to the frame and the pivotal mounting of each shoe to its respective link, the diameter of the circumference defined by the shoes may be varied to accommodate various size objects. In the instance of vehicle tire components, the range of diameters desirably is large so that a single transfer ring or drum can be used in the manufacture of tires of different sizes.

All of the links are pivotally mounted to the frame at locations which lie within a common circle about the central rotational axis 36 of the frame. As the links are pivoted about their respective pivot axes in the process of changing the diameter of the circumferential surface defined by the shoe, the shoes move both radially inwardly or outwardly of the frame and circumferentially toward or away from each other, i.e. in an arcuate path. This arcuate path 171 is depicted in FIG. 4. It will be recognized that as each shoe moves along its arcuate path, it is imperative that the pivotal movement of the shoes be restrained to the extent that the arcuate surfaces of the shoes continue to collectively define a circumferential surface that is concentric with the central axis of the frame. Failure of the shoes to maintain this circularity of orientation over the full range of possible diameters of the circumferential surface defined by the shoes results in uneven pressure being applied to the object being grasped by the apparatus.

The several links 38 and the drive link 40 are interconnected for simultaneous and equal rotation of the links about their respective rotational axes of mounting to the frame 20, as effected by the drive unit 42. In the embodiment depicted in FIGS. 3 and 4 specifically, the respective distal extensions 70 of the several links 38 are interconnected by means of a plurality of rigid connecting rods 210, each of which is provided with a turnbuckle 212 for adjusting the length of the rod 210. One end 214 of each rod 210 is pivotally connected as by a pin 216 (typical) (FIG. 4) to a through bore 74 in the distal extension 70 of a link 38. The opposite end 218 of the rod 210 is connected in like manner to a through bore 72' of a circumferentially adjacent link 38' for example. A keeper plate 219 is employed to secure the connection of the rod ends to each link. In like manner, all of the links 38 are interconnected for simultaneous rotational movement thereof. The links 38 are similarly connected to the drive link 40 employing through bores 220 and 222 provided on the end 120 of the drive link 40 so that upon rotation of the drive link 40 by the drive unit 42, all the links rotate about their respective rotational axes by the same amount and simultaneously. Accordingly, this rotational movement of the links produces radial displacement of the shoes 150 along their respective arcuate paths, the shoe movements being of the same amount and simultaneous. To ensure that all of the shoes are displaced radially to the same extent, the linear distance between adjacent ones of the distal extensions 70 of the links 38, and between the drive link 40 and its adjacent links 38, is adjustable by means of manipulation of the turnbuckles 212. It is further noted that the through bores 72 and 74 of each of the links 38 (and the through bores 220 and 222 of the drive link 40) are displaced radially by different amounts as the links are rotated so that these through bores are themselves displaced radially by different distances to thereby accommodate the radial displacement of these through bores as the links are rotated about their respective rotational axes.

In accordance with the present invention, one of the first and second elongated mounting lugs, lug 160, for example, (FIG. 10) of each shoe is provided with a first slot 172 defined therein adjacent one end 174 of the lug 160 and a second slot 176 defined therein adjacent the opposite end 178 of the lug. Each slot opens outwardly of its respective end of its lug. The first slot 172 defined in the end of the lug 160 is configured to receive therein one end 180 of a rigid rod 182 with the opposite and outboard end 184 of the rod 182 projecting from the lug 160 in the direction of a circumferentially adjacent shoe (see FIG. 4). The second slot 176' of the adjacent shoe 38' is configured to slidably receive the outboard end 184 of this rod 182. In accordance with one feature of the present invention, the first slot 172 of the shoe 150 and the second slot 176' of an adjacent shoe 150' lie in a common plane and further are oriented along a common longitudinal axis which is the longitudinal axis of the rod 182. The rigidity of the rod 182 thus restrains adjacent shoes 150 and 150', for example, to a common degree of pivotal rotation about their respective pivotal axes as the shoes move along their respective arcuate paths as the diameter defined by the shoes is increased or decreased. The length of the rod 182 is chosen to ensure that its outboard end 184 remains within its respective second slot 176' of the adjacent shoe 152' when the shoes 150 and 150' are moved to their maximum limit of outward radial position relative to the frame (i.e. to the maximum diameter of the circumferential surface collectively defined by the shoes). In the depicted embodiment, the end 180 of the rod 182 is releasably held within its respective first slot 172 as by two spaced-apart countersunk bolts 190 and 192 that are threadably received within respective bores 194 and 196 (FIG. 10) provided in the lug 160 adjacent the first slot 172 such that the heads of the bolts engage and hold the rod end in the first slot 172 of the shoe. As noted, the outboard end 184 of the rod slides within the second slot 176' of the adjacent shoe 38' so that the longitudinal axes of the first slot 172 of the shoe 38 and of the second slot 176' of the adjacent shoe 38' remain in register and with their individual lengths aligned with the common longitudinal axis of the rod 182. By this means, the adjacent shoes are interconnected and are restrained to the same degree of pivotal rotation about their respective pivot axes as the shoes are displaced radially inwardly and outwardly with respect to the central axis of the frame.

Figure 13:
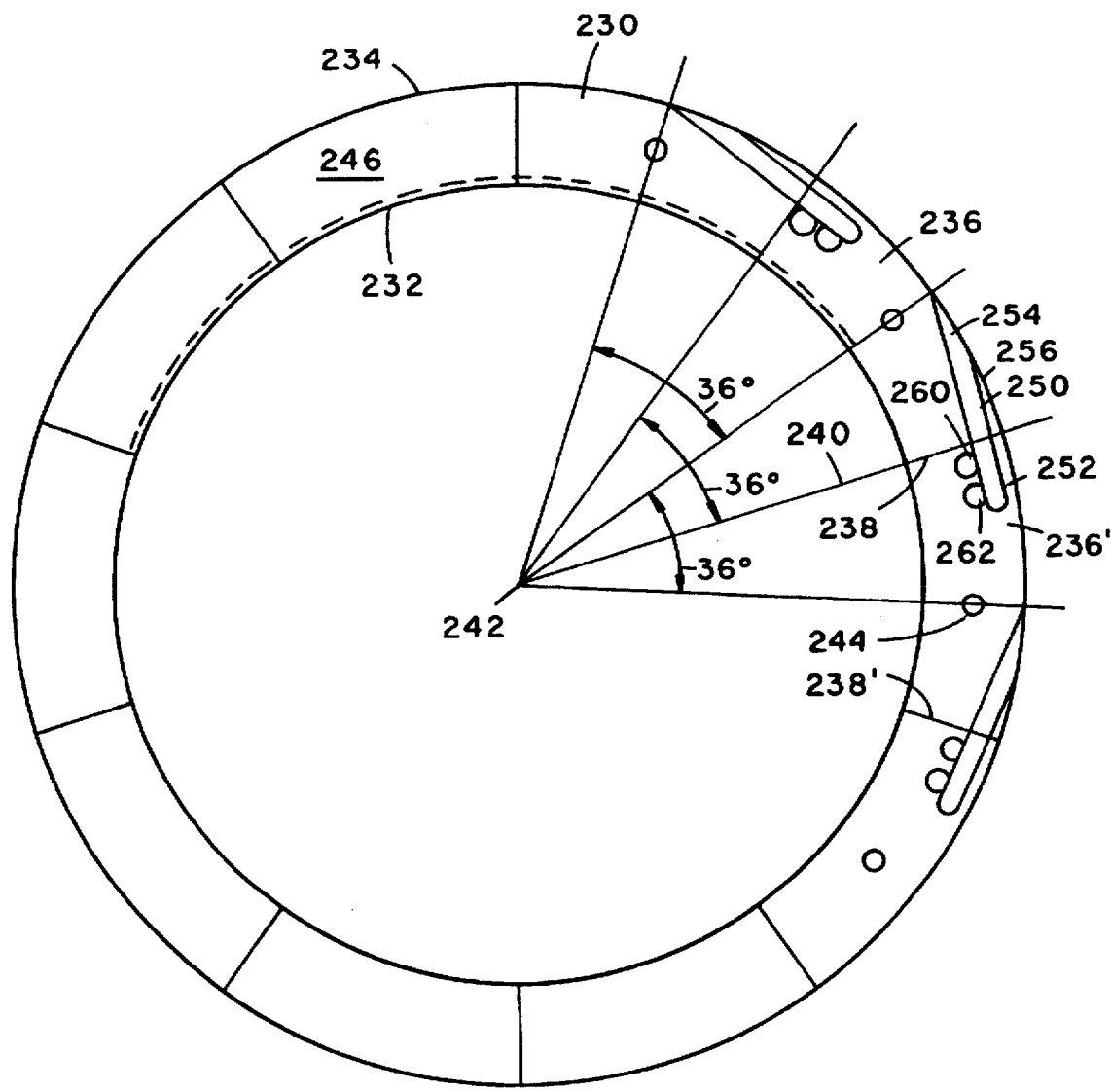
FIG. 13 is a diagrammatic representation of the layout of a solid ring and various manufacturing operations performed thereon for producing lugs for mounting shoes in the apparatus of the present invention.

With specific reference to FIG. 13, in a preferred method for the manufacture of the lugs 160 and 162 of the individual shoes 150, there is initially provided a ring 230 having an inner diameter 232 which is substantially equal to the minimum anticipated operating diameter of the apparatus of the present invention. The ring further has an outer diameter 234 which establishes the radial dimension of a lug. This ring is divided by cut lines 238 into a preselected number of equally-sized segments 236, 236', for example, (ten segments being depicted in FIG. 13) the cut-lines thus being spaced apart by 36 degrees about the circumference of the ring. The cut-line division between segments extends along a radius 240 that extends outwardly from the center 242 of the ring. Each such division constitutes a cut-line for the eventual cutting of the segments into individual lugs.

Prior to the cutting of the ring segments into individual lugs, the ring is provided with a through bore 244 through the thickness of the ring 230 at a location equidistant from circumferentially adjacent cut-lines 238 and 238'. This through bore constitutes the through bore 170 (see FIG. 11) which serves as the mounting location for the pivot pin 152 employed to pivotally mount a link 38, for example, to the frame 20. This action locates the through bores 244 in thirty-six degrees spaced apart relationship about the circumference of the ring.

Further, prior to cutting of the ring segments into individual lugs, there is machined into the face 246 of the ring a slot 250. This slot extends across a cut-line 238 between adjacent segments 236 and 236'. This slot includes a closed end 252 that is located within one of the segments 236'. Its opposite end 254 exits the outer circumferential margin 256 of a circumferentially adjacent further segment 236. It is to be noted that when the ring is cut into individual segments along the several cut-lines, the end 252 of the slot 250 becomes a part of the segment 236' and the opposite end 254 of the slot 250 becomes a part of the circumferentially adjacent segment 236.

Still further, each segment of the ring is provided with at least one, and preferably two, internally threaded bores 260 and 262 which serve to receive therein the bolts 190 and 192(see FIG. 10) which mount the rigid rod 182 to a lug.

After the through bore 244, the slot 250, and the threaded bores 260 and 262 have been machined in the ring, the ring is cut along the cut-lines to divide the ring into essentially identical individual lugs.

Notably, machining of the bores and slots about the circumference of the ring is readily accomplished employing a single machine setup. Further, this manufacturing technique provides for very precise location of each of the bores and slots about the circumference of the ring and at precisely spaced apart locations relative to one another. Still further, this machining technique provides for accurate alignment of the longitudinal axis of the slot 250 at right angles to a radius 240 of the ring so that when the lugs are employed in the mounting of the shoes to the frame, that portion of a slot 250 which is associated with a first lug 236' is longitudinally coaxially aligned with that second portion 254 of the same slot 250 that is associated with the lug 236 of a second and circumferentially adjacent shoe 150'. Accordingly, the manufacture of the lugs is carried out more precisely and relatively less expensively than if each lug were individually machined.

What is claimed:

1. In an apparatus defining an outer circumference or an inner circumference suitable to serve as a forming surface or as a circumference-engaging surface, the improvement comprising frame means having a central axis, a plurality of shoes each of which includes an arcuate surface which in combination with the arcuate surfaces of others of the shoes collectively define a circumference, means for hingedly mounting each of said shoes to said frame means in circumferentially adjacent relationship about said central axis of said frame means, said shoes being radially displaceable inwardly and outwardly with respect to the central axis of said frame means such that said shoes move toward one another when said shoes are moved radially inwardly and away from one another when said shoes are moved radially outwardly, said means for hingedly mounting each of said shoes including elongated link means having an inboard end and an outboard end and means rotatably securing said link means to said frame means at a location along the length dimension of said link means intermediate its inboard and outboard ends, each of said shoes including first slot means defined in a first side margin thereof and second slot means defined in a second and opposite side margin thereof so that when said shoes are mounted in circumferentially adjacent relationship, the first slot means of each shoe faces the second slot means of a circumferentially adjacent shoe, a plurality of rigid rod means having first and second end portions, each of said rods having one of its end portions anchored in one of said first slot means of a first one of said plurality of shoes, and having its opposite end portion slidably received within a second slot means of a circumferentially adjacent one of said shoes to thereby interconnect and restrain said plurality of shoes to substantially identical degrees of rotation about their respective hinge axes.

2. The apparatus of claim 1 wherein said first and second slot means possess a common longitudinal axis.

3. The apparatus of claim 2 wherein said common longitudinal axis of said first and second slot means is oriented at a right angle to a radius of said frame means.

4. The apparatus of claim 1 and including a plurality of said link means, and a plurality of connector rods operatively connecting said link means together such that rotation of one link means about its rotational axis results in like rotation of every other of said interconnected link means about their respective rotational axes, hence like displacement of the respective shoes mounted on said link means.

5. The apparatus of claim 1 wherein said plurality of shoes comprises segments cut from a solid ring.

* * * * *